(12) United States Patent
Caldwell

(10) Patent No.: US 10,510,113 B2
(45) Date of Patent: Dec. 17, 2019

(54) PROVIDING FINANCIAL TRANSACTION DATA TO A USER

(71) Applicant: MX TECHNOLOGIES, INC., Lehi, UT (US)

(72) Inventor: John Ryan Caldwell, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 905 days.

(21) Appl. No.: 14/481,776

(22) Filed: Sep. 9, 2014

(65) Prior Publication Data

US 2015/0081531 A1 Mar. 19, 2015

Related U.S. Application Data

(60) Provisional application No. 61/875,433, filed on Sep. 9, 2013.

(51) Int. Cl.
*G06Q 40/02* (2012.01)
*G06Q 20/38* (2012.01)

(52) U.S. Cl.
CPC .......... *G06Q 40/02* (2013.01); *G06Q 20/38* (2013.01)

(58) Field of Classification Search
CPC ..................................... G06Q 40/02
USPC ........................................... 705/39
See application file for complete search history.

(56) References Cited

U.S. PATENT DOCUMENTS

| | | | | |
|---|---|---|---|---|
| 6,097,834 A | * | 8/2000 | Krouse | G06Q 20/04 382/137 |
| 6,668,253 B1 | * | 12/2003 | Thompson | G06Q 10/06 |
| 7,966,329 B1 | * | 6/2011 | Rukonic | G06Q 40/02 705/35 |
| 2005/0098623 A1 | * | 5/2005 | Kim | G06Q 20/209 235/380 |
| 2006/0101323 A1 | | 5/2006 | Satyavolu | |
| 2008/0103949 A1 | * | 5/2008 | Lobana | G06Q 40/00 705/35 |
| 2010/0138328 A1 | | 6/2010 | Venturo | |
| 2010/0169168 A1 | | 7/2010 | Satyavolu | |

(Continued)

OTHER PUBLICATIONS

U.S. Appl. No. 14/481,775 Office Action dated Oct. 30, 2017.

(Continued)

*Primary Examiner* — Alexander G Kalinowski
*Assistant Examiner* — Paul R Kloberg
(74) *Attorney, Agent, or Firm* — Kunzler Bean & Adamson, PC

(57) ABSTRACT

The disclosure extends to computer-implemented personal financial management tools, methods and systems for providing financial transaction data to a user in the form of transaction images, such as check images, deposit images, receipt images, and other transaction related images, which may be incorporated into the personal financial management tool. The disclosure also extends to computer-implemented personal financial management tools, methods and systems for receiving core data, which may include transaction data, from a financial or banking institution and processing the data by cleansing the data, automatically categorizing the data, classifying the data, and then sending that processed data back to the financial or banking institution. The disclosure also extends to receiving and sending such data to and from the financial or banking institution in real-time.

8 Claims, 17 Drawing Sheets

(56) References Cited

U.S. PATENT DOCUMENTS

| | | | |
|---|---|---|---|
| 2011/0270748 A1* | 11/2011 | Graham, III | G06Q 20/102 705/40 |
| 2012/0203632 A1* | 8/2012 | Blum | G06Q 30/0255 705/14.53 |
| 2013/0090961 A1* | 4/2013 | Smith | G06Q 10/00 705/7.11 |
| 2014/0136381 A1* | 5/2014 | Joseph | G06Q 40/02 705/35 |
| 2015/0032602 A1* | 1/2015 | Blackhurst | G06Q 40/02 705/39 |
| 2015/0049914 A1* | 2/2015 | Alves | G06K 9/033 382/105 |
| 2016/0027124 A1* | 1/2016 | Rojas | G06Q 30/06 705/30 |
| 2017/0161844 A1* | 6/2017 | Rojas | G06Q 40/12 |

OTHER PUBLICATIONS

U.S. Appl. No. 14/481,775 Final Office Action dated Apr. 30, 2018.
U.S. Appl. No. 14/481,775 Final Office Action, dated Oct. 8, 2019.

* cited by examiner

PROVIDING FINANCIAL TRANSACTION DATA TO A USER

CROSS-REFERENCE TO RELATED APPLICATIONS

This application claims the benefit of U.S. Provisional Application No. 61/875,433, filed Sep. 9, 2013, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

STATEMENT REGARDING FEDERALLY SPONSORED RESEARCH OR DEVELOPMENT

Not applicable.

FIELD OF THE DISCLOSURE

The disclosure relates generally to computer-implemented personal financial management tools, methods and systems, and more particularly, but not necessarily entirely, to computer-implemented personal financial management tools, methods and systems that provide financial transaction data to a user.

BACKGROUND

Many personal financial management tools or software programs or products assist a user in tracking, budgeting or otherwise maintaining the user's finances. Such personal financial management tools or software products track current financial activity, such as bill paying, account reconciliation and budgeting, as well as long-term financial planning, such as saving for a home or investing for retirement. Typically, the current financial activity is modeled using text-based account screens that mimic checkbook registers. Long-term planning is usually a less accurate process; loosely correlated to current financial activity. Such long-term planning consists of either broadly estimating expenses into the future such as assuming needing a certain percentage of current income and expenses at retirement, or estimating income from select assets or investments and then computing payment schedules or compound interest accrued over the years until retirement.

Most personal financial management tools and software products track financial transactions that have been posted to a user's bank account or other financial account. Such personal financial management tools and software programs login to a user's banking system and pull, scrape, or otherwise retrieve information or data relating to that user's financial transactions. The financial transaction data is then utilized by the personal financial management tools and software products for various tracking, budgeting or other financial maintenance purposes. These personal financial management tools and software products, while containing some data regarding a financial transaction that was completed using a check or a financial transaction involving a deposit, fail to directly pull the image into the personal financial management tools and software products. Accordingly, data and information, such as the payee on a check for example, are unknown to the personal financial management tools and software products.

Further, existing personal financial management tools and software products are unable to further identify or process descriptions of transactions, which often represent the payee or the merchant. It will be appreciated that existing personal financial management tools and software providers provide their tools or software product as a separate module of a financial or banking institution's core data system, whether presented online or otherwise.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

What is needed are methods and systems that are efficient at providing financial transaction data to a user in the form of transaction images, such as check images, deposit images, receipt images, and other transaction related images, which may be incorporated into the personal financial management tool. What is also needed are methods and systems that are efficient at receiving core financial data from a financial or banking institution and processing the data by cleansing the data, automatically categorizing the data, classifying the data, and then sending that processed data back to the financial or banking institution in real-time.

The disclosure extends to computer-implemented personal financial management tools, methods and systems for providing financial transaction data to a user in the form of transaction images, such as check images, deposit images, receipt images, and other transaction related images, which may be incorporated into the personal financial management tool. The disclosure also extends to computer-implemented personal financial management tools, methods and systems for receiving core data, which may include transaction data, from a financial or banking institution and processing the data by cleansing the data, automatically categorizing the data, classifying the data, and then sending that processed data back to the financial or banking institution. The disclosure also extends to receiving and sending such data to and from the financial or banking institution in real-time.

In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

Figure 1:
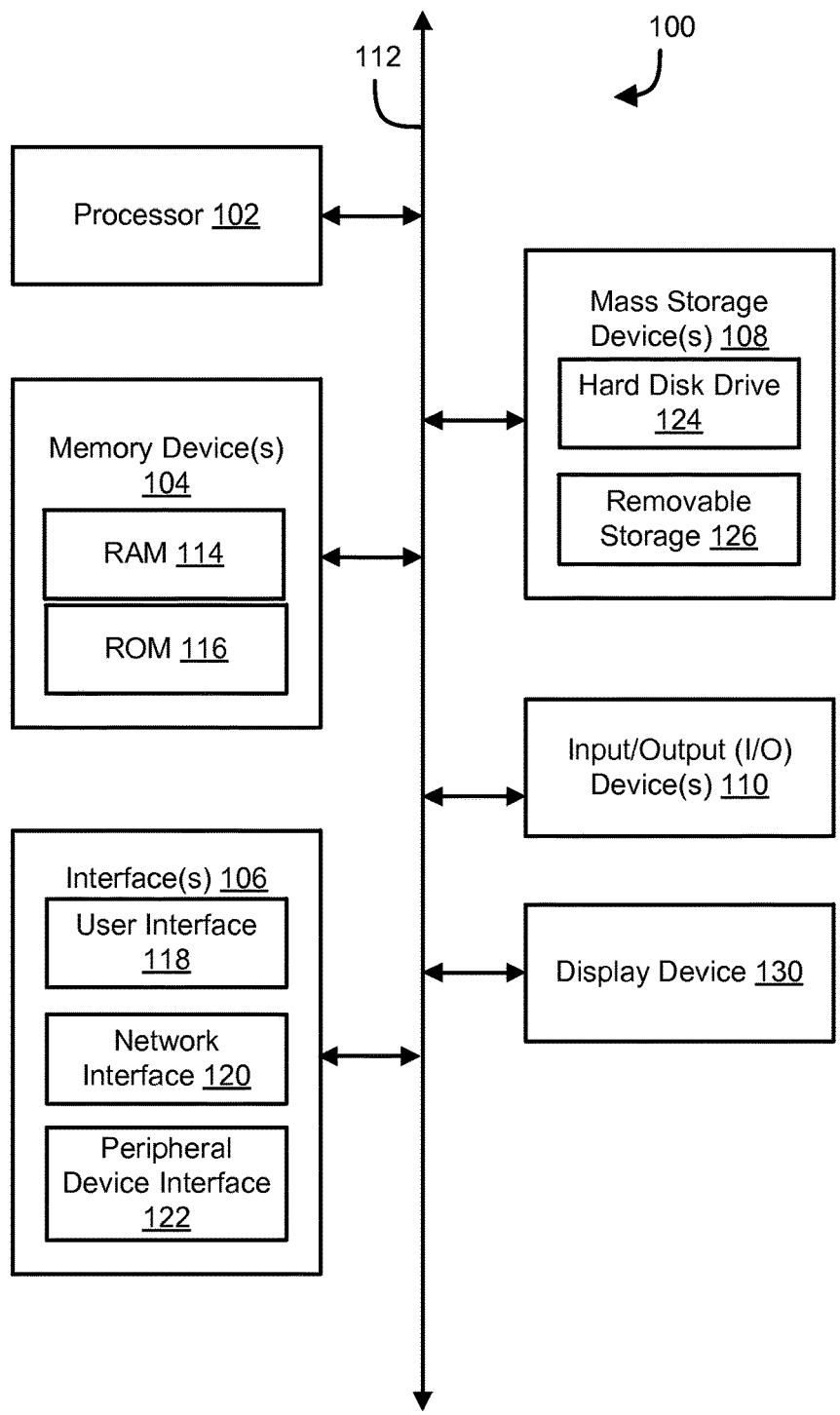
FIG. 1 illustrates an example block diagram of a computing device in accordance with the teachings and principles of the disclosure.

Referring now to the figures, FIG. 1 is a block diagram illustrating an example computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. For purposes of this disclosure, computing device 100 can be one or more of any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 may include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, or any suitable user interface now known to those of ordinary skill in the field, or later discovered), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
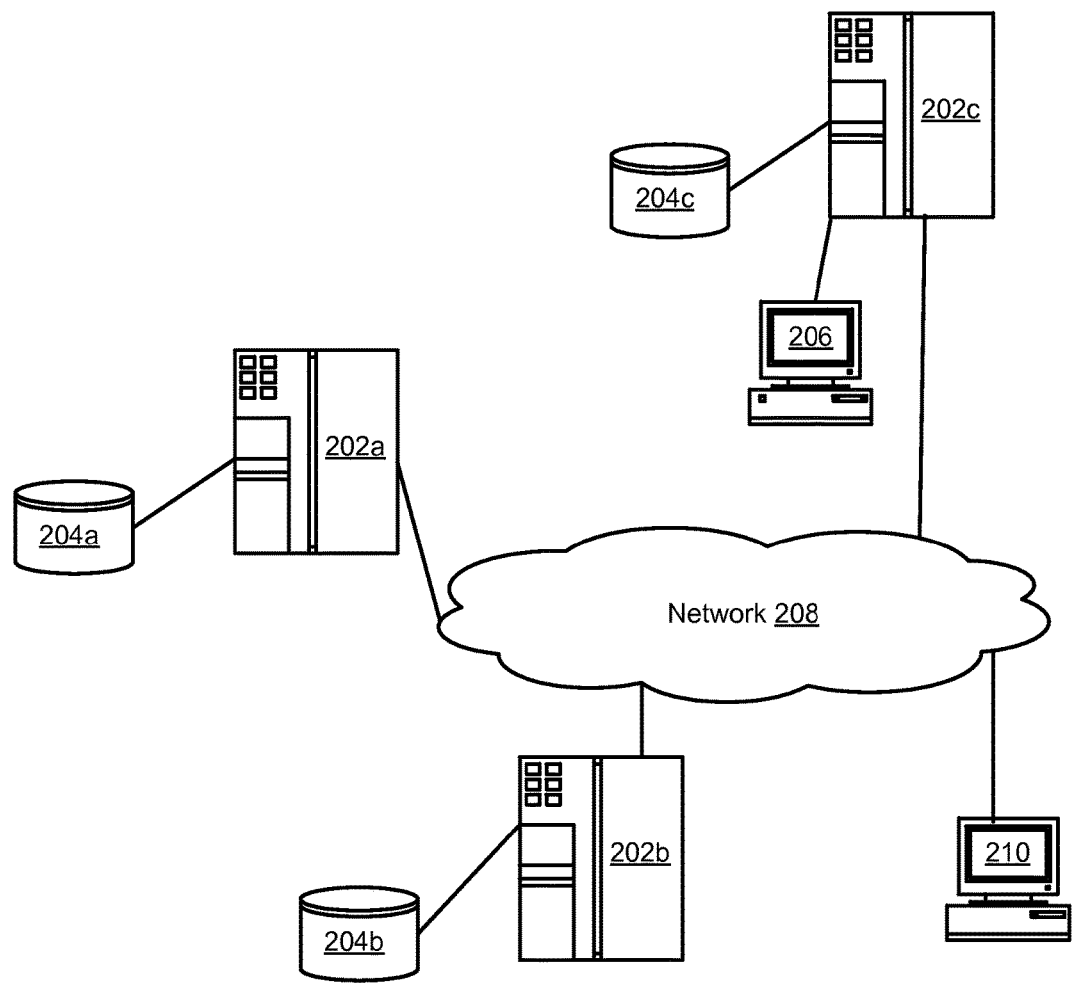
FIG. 2 illustrates an example computer architecture that facilitates different implementations described herein in accordance with the teachings and principles of the disclosure.

Referring now to FIG. 2, there is illustrated an example of a computing environment 200 suitable for implementing the described data transactions, including the systems and methods disclosed herein. In some implementations, a server 202a provides access to a database 204a in data communication therewith. The database 204a may store item information and may record information, such as data relating to one or more financial transactions. The database 204a may additionally store information contained in a plurality of records for a class or subgroup of users or customers. The server 202a may provide access to the database 204a to users and customers. The server 202a may require logins based on membership or license in order to provide access. The server 202a may provide and allow access to original source systems such as, for example, a financial or banking institutions core data systems or the like that provide data relating to a financial transaction. For example, the server 202a may implement a web server for receiving requests for data stored in the database 204a and formatting requested information into web pages that may be provided to users or customers. The web server may additionally be operable to receive information and store the information in the database 204a.

A server 202b provides access to a database 204b in data communication therewith. The database 204b may store data and information and may record such data and information. The database 204b may additionally store information contained in a plurality of data records. The server 202b may provide users access to the database 204b. The server 202b may require logins based on membership or license in order to provide access. The server 202b may provide and allow access to original source systems. For example, the server 202b may implement a web server for receiving requests for data stored in the database 204b and formatting requested information into web pages that may be provided to users. The web server may additionally be operable to receive information and store the information in the database 204b.

A server 202c may be associated with an entity for providing reporting services and user requested reports. The server 202c may be in data communication with a database 204c. The database 204c may store data or information regarding a financial transaction and/or other types of data or information. The server 202c may analyze this information as well as data retrieved from the database 204a and database 204b in order to perform the methods as described herein. An operator may access the server 202c by means of a workstation 206 that may be embodied as any general purpose computer, tablet computer, smart phone, or the like. The server 202c may require logins based on membership or license in order to provide access. The server 202c may provide and allow access to original source systems such as, for example, financial transaction data. For example, the server 202c may implement a web server for receiving requests for data stored in the database 204c and formatting requested information into web pages that may be provided to users. The web server may additionally be operable to receive information and store the information in the database 204c.

It will be appreciated that the server 202a, server 202b and server 202c may communicate over a network 208 such as the Internet or some other local area network (LAN), wide area network (WAN), virtual private network (VPN), or other network. A user may access data and functionality provided by the servers 202a, 202b, 202c by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a, 202b, 202c and databases 204a, 204b, 204c may have some or all of the attributes of the computing device 100.

Referring now to FIGS. 3-9, wherein various methods and systems of providing financial transaction data to a user are illustrated. It will be appreciated that many existing personal financial management tools and software programs or products utilize financial transaction data to provide a user with the ability to track, budget or otherwise maintain the user's finances. Such personal financial management tools and software programs, whether provided as an online service (SAS model or otherwise), as an app for use on a mobile computing device, as a software product, as part of an online banking service, or otherwise, login to a user's banking system and pull, scrape, or otherwise retrieve information or data relating to that user's financial transactions. It will be appreciated that the financial transactions may be a variety of transactions, including, without limitation, a purchase or debit through a credit card, debit card, check or cash withdrawal. The financial transactions may also be an online banking deposit, direct deposit, a deposit at a brick and mortar bank, or any other financial transaction or some combination of the above noted financial transactions. The financial transaction data is then utilized by the personal financial management tools and software products for various tracking, budgeting or other financial maintenance purposes. These personal financial management tools and software products, while containing some data regarding a financial transaction that was completed using a check or a financial transaction involving a deposit, fail to directly pull the image into the personal financial management tools and software products. Accordingly, data and information, such as the payee on a check for example, are unknown to the personal financial management tools and software products. The disclosure contemplates and utilizes an algorithm to pull financial transaction data and images into the personal financial management tool and software product of the disclosure so that additional financial transaction data may be obtained and utilized by a user.

Figure 3:
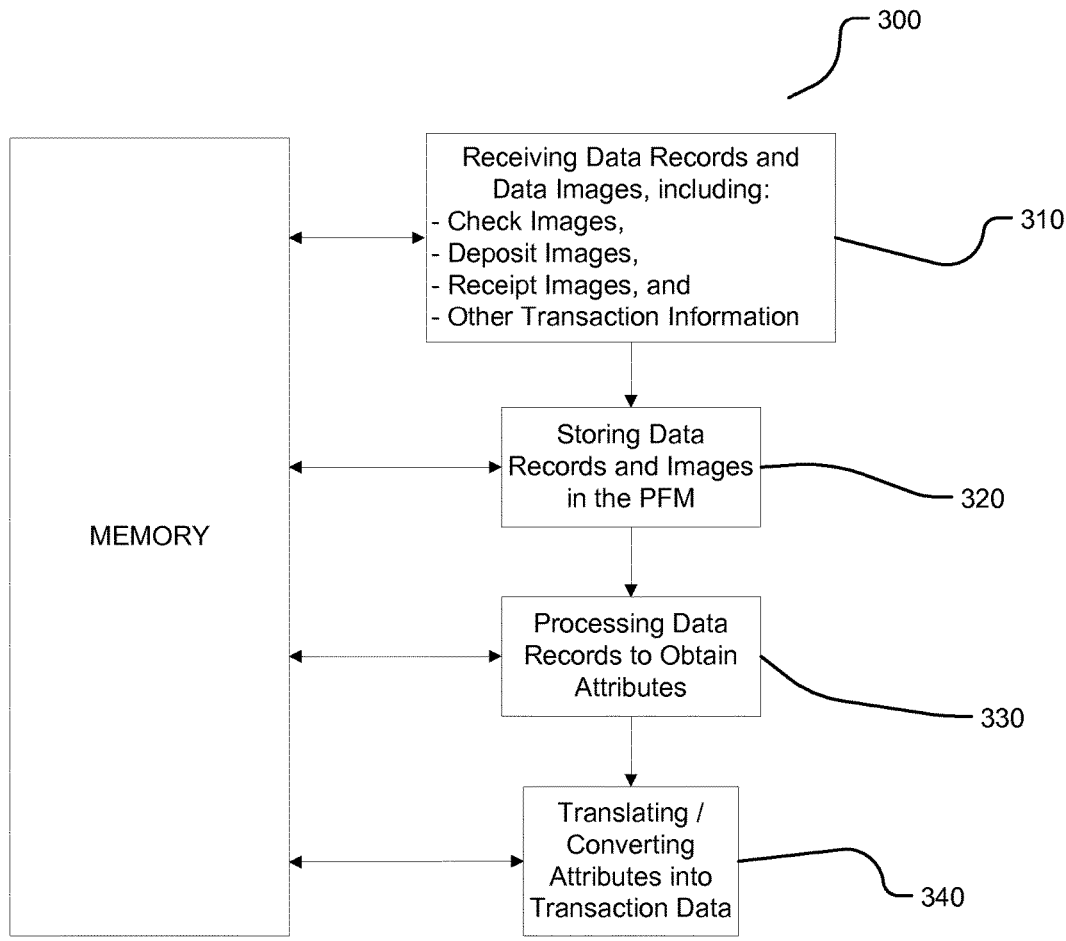
FIGS. 3-5 illustrate flow charts of example methods of receiving data records, such as check images, deposit images, receipt images, and other transaction records and processing additional data from such data records according to one implementation consistent with the teachings and principles of the disclosure.
Figure 4:
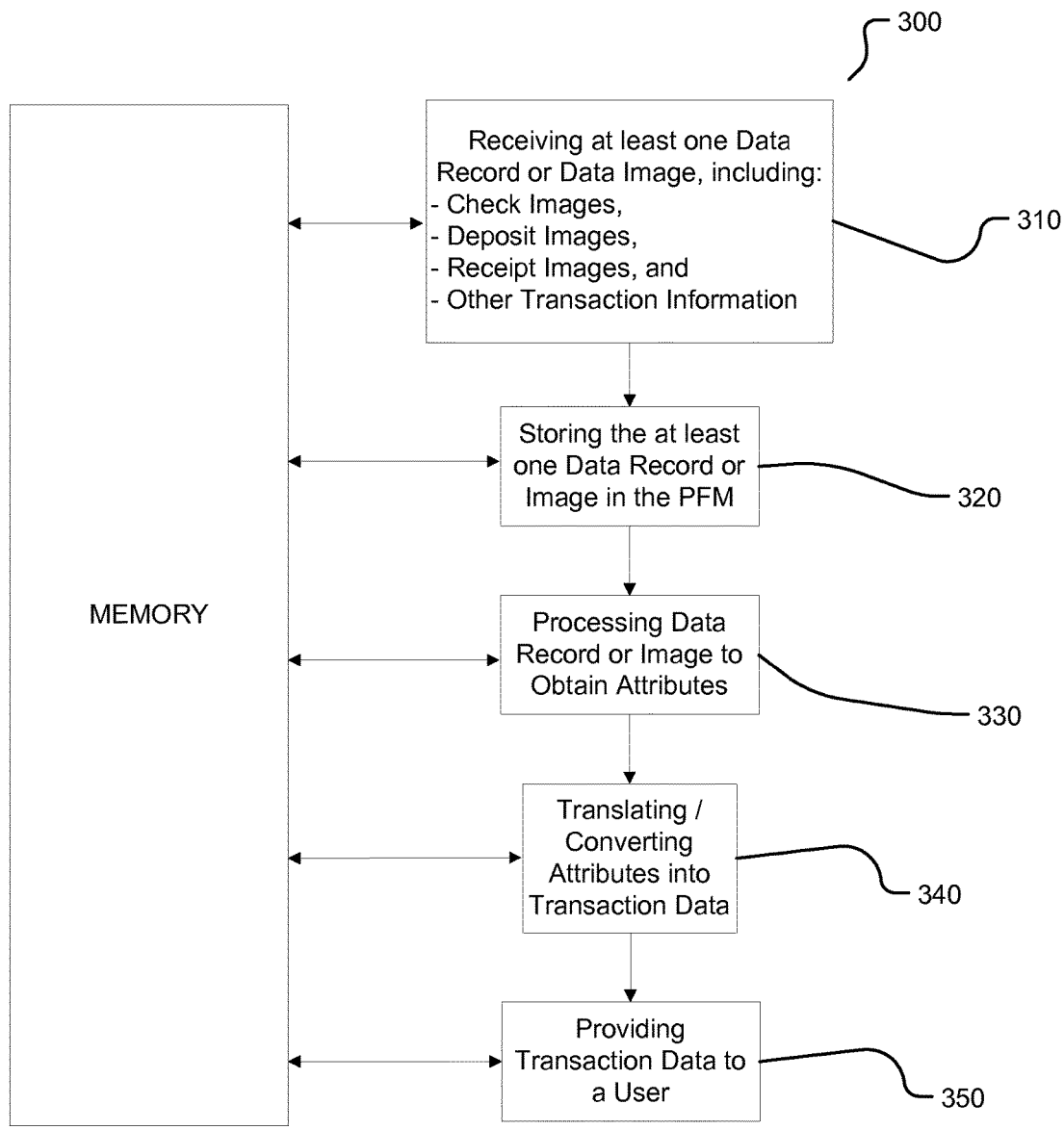
Figure 5:
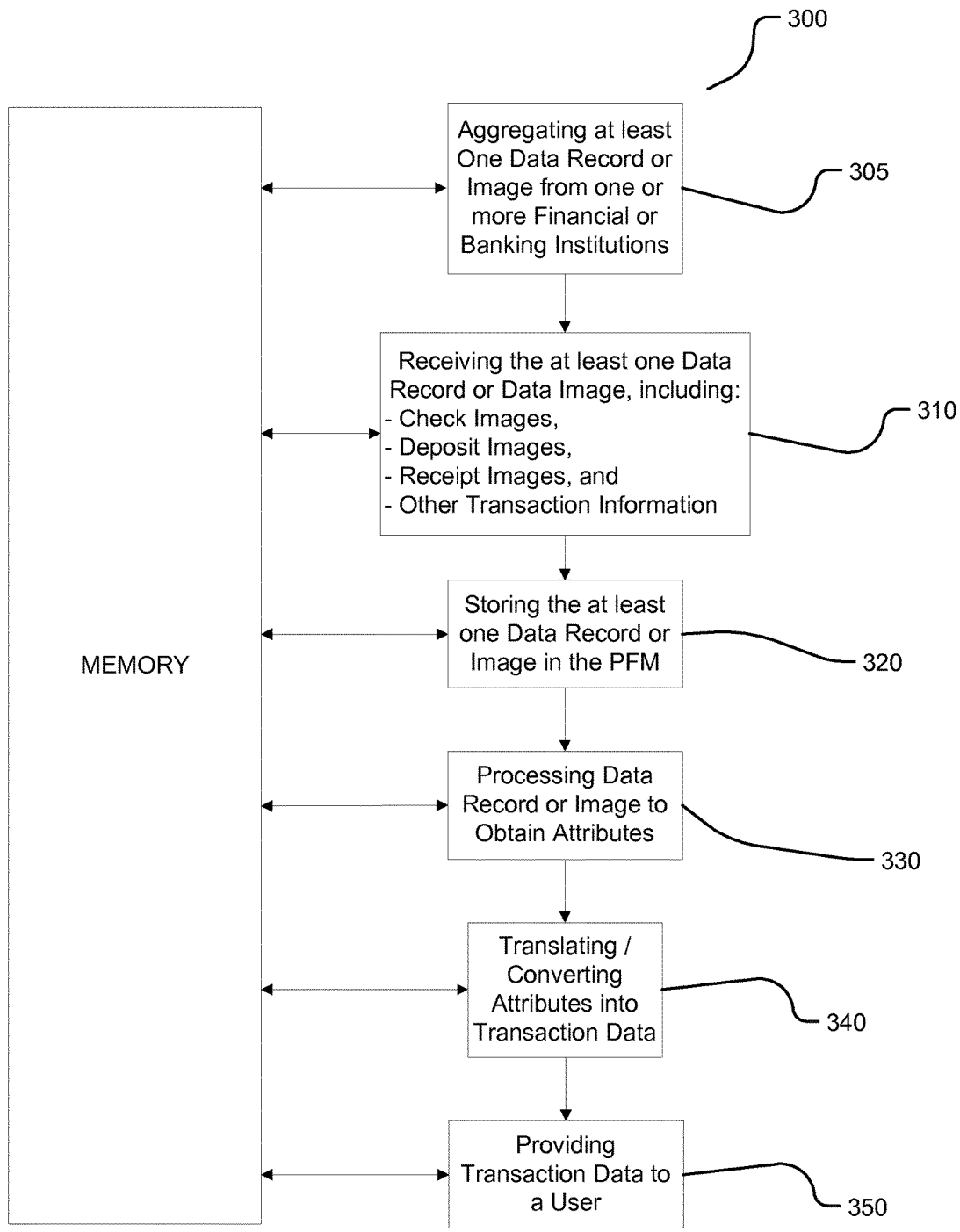

More specifically referring to FIGS. 3-5, implementations of a method 300 of the disclosure are illustrated. In an implementation illustrated in FIG. 3, a personal financial management tool or software product may receive at least one data record, or a plurality of data records, comprising one or more of the following: (1) check images, (2) deposit images, (3) receipt images, and/or (4) other data and images relating to a real world financial transaction over a computer network at 310. The images may be pulled into the personal financial management tool or software product of the disclosure so that on a transaction by transaction level a user has the ability to understand the nature of each individual transaction. It will be appreciated that the at least one data record may itself comprise various attributes of the financial transaction. At 320, the at least one data record may be stored in memory or computer readable storage. At 330, the at least one data record may be processed to obtain the attributes of the financial transaction. At 340, the attributes of the financial transaction may be translated or converted into transaction data. It will be appreciated that the transaction data may comprise a string of computer readable characters, so that a user may obtain the financial transaction data over a computer network or so that the information is otherwise readable by a computer. It will be appreciated that in an implementation, the transaction data may be provided to a user at 350 in FIG. 4.

In an implementation of the method disclosed herein, the attributes of the financial transaction may comprise a date, a payee, an amount of the financial transaction, and any other additional data contained on the at least one data record. In addition to the check image, deposit image, receipt image or other image itself being pulled into the personal financial management tool or software product, one or more of the attributes may be pulled into the personal financial management tool or software product of the disclosure.

In an implementation of the method disclosed herein, the user may be a third party personal financial management software provider. In an implementation of the method disclosed herein, the user may be an end user of personal financial management software. In an implementation of the method disclosed herein, the user may be a financial institution, such as a bank, insurance company, financial management company, or any other financial institution. In an implementation of the method disclosed herein, the user may be a banking provider, either a brick and mortar banking provider or an online banking provider.

In an implementation of the method disclosed herein and illustrated in FIG. 3B, the at least one data record may be received using an aggregation method that gathers data from one or more financial institutions. In an implementation of the method disclosed herein, the method may further comprise aggregating and gathering the at least one data record from one or more financial institutions at 305.

In an implementation of the method disclosed herein, the transaction data may be provided to a user in real-time.

In an implementation of the method disclosed herein, the attributes may comprise a category of the financial transaction, a classification of the financial transaction, and other additional data relating to the financial transaction and contained on the at least one data record.

Figure 6:
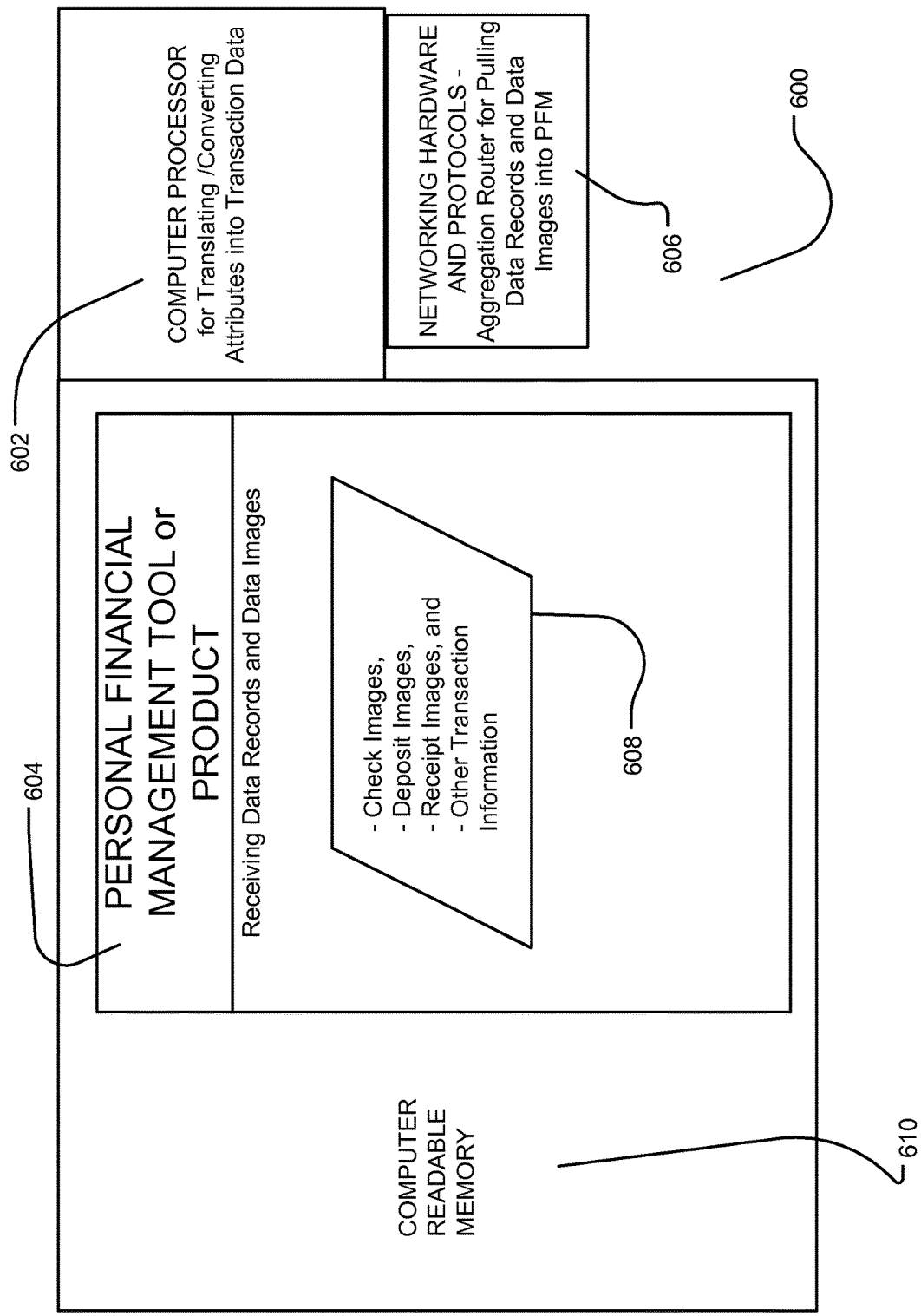
FIG. 6 illustrates an example system of providing financial data relating to a real world financial transaction to a user according to one implementation consistent with the teachings and principles of the disclosure.

Referring specifically to FIG. 6, a system of providing financial data relating to a real world financial transaction to a user is illustrated. The system 600 may comprise a personal financial management tool 604 comprising a series of computer readable instructions. The system 600 may also comprise an aggregation router 606 that pulls financial transaction data from at least one financial institution in the form of at least one data record 608 into the personal financial management tool 604. The at least one data record 608 may be comprised of one or more of the following: check images, and/or deposit images, and/or receipt images, and/or other data relating to a real world financial transaction. It will be appreciated that the at least one data record 608 may comprise attributes of the financial transaction. The system 600 may further comprise a processor 602, as described herein above in connection with FIG. 1, for running computer readable instructions that translate the at least one data record into a string of computer readable characters that represent the attributes of the financial transaction. The system 600 may also comprise computer readable memory or storage 610 for storing the financial transaction data therein for access by a user.

In an implementation of the system disclosed herein, the attributes may comprise a date, a payee, an amount of the financial transaction, and any other additional data contained on the at least one data record.

In an implementation of the system disclosed herein, the user may be a personal financial management software provider. In an implementation of the system disclosed herein, the user may be an end user of personal financial management software. In an implementation of the system disclosed herein, the user may be a financial institution, such as a bank, insurance company, financial management company, or any other financial institution. In an implementation of the system disclosed herein, the user may be a banking provider, either a brick and mortar banking provider or an online banking provider.

In an implementation of the system disclosed herein, the transaction data may be provided to a user in real-time.

In an implementation of the system disclosed herein, the attributes may comprise a category of the financial transaction, a classification of the financial transaction, and other additional data relating to the financial transaction and contained on the at least one data record.

Figure 7:
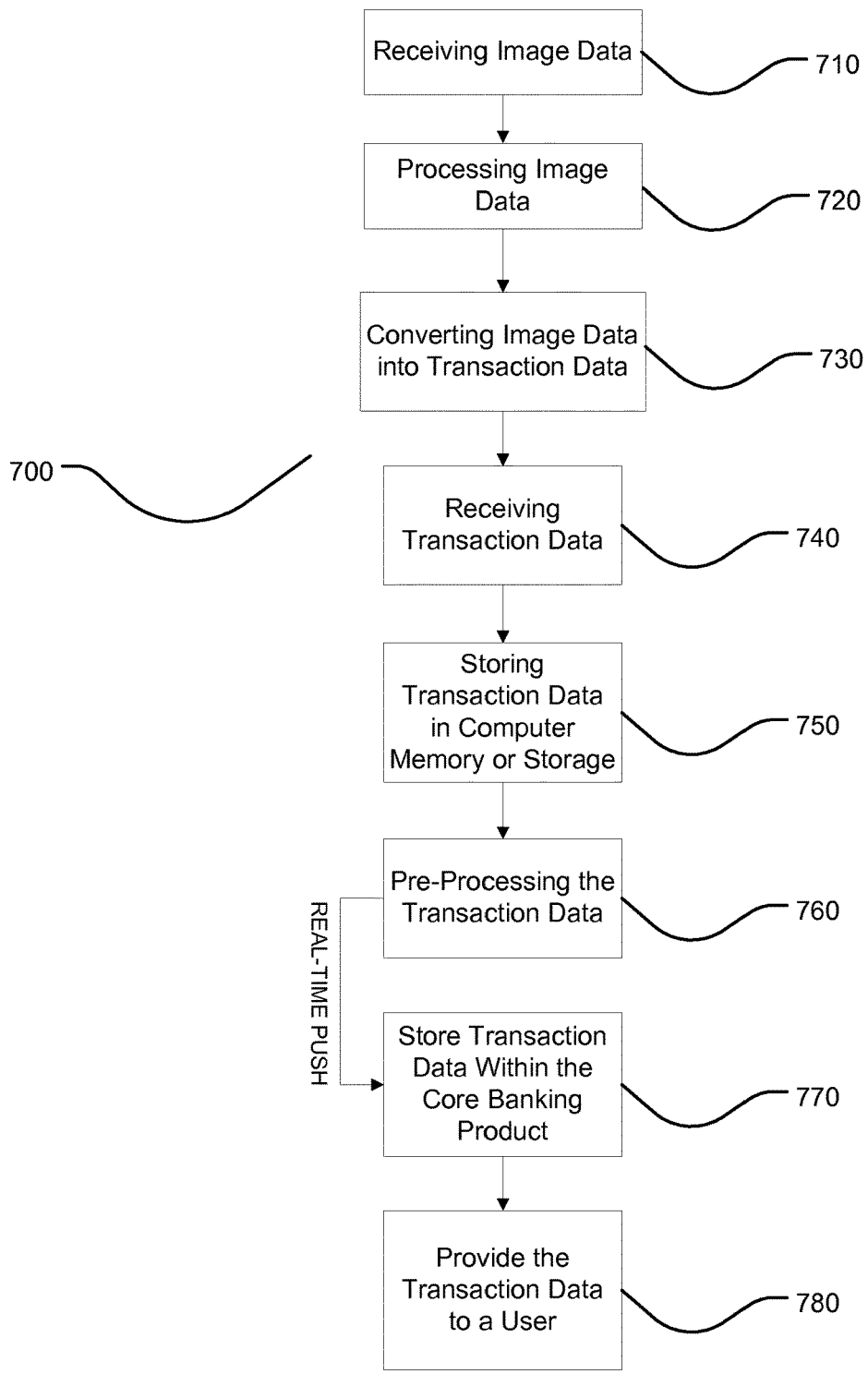
FIG. 7 illustrates a flow chart of an example method of receiving image data records, such as check images, deposit images, receipt images, and other transaction records from a financial institution and processing additional data from such data records and pushing that information back the financial institution according to one implementation consistent with the teachings and principles of the disclosure.

Referring now to FIG. 7, there is illustrated an implementation of a method of providing financial data relating to a real world financial transaction to a user. The method 700 may include receiving image data records at 710. Such image data records may comprise check images, deposit images, receipt images, and other transaction records from a financial institution. The image data may be processed at 720 to obtain additional data from such data records. At 730, the image data may be converted or translated into transaction data that may be used by a personal financial management tool or software product. At 740, the converted or translated data is received. At 750, the transaction data is stored in computer readable memory or storage. At, 760 the transaction data may be further processed. The processed data may be pushed in real time to back to the financial institution and stored at 770 and provided to a user at 780 according to one implementation consistent with the teachings and principles of the disclosure.

Figure 8:
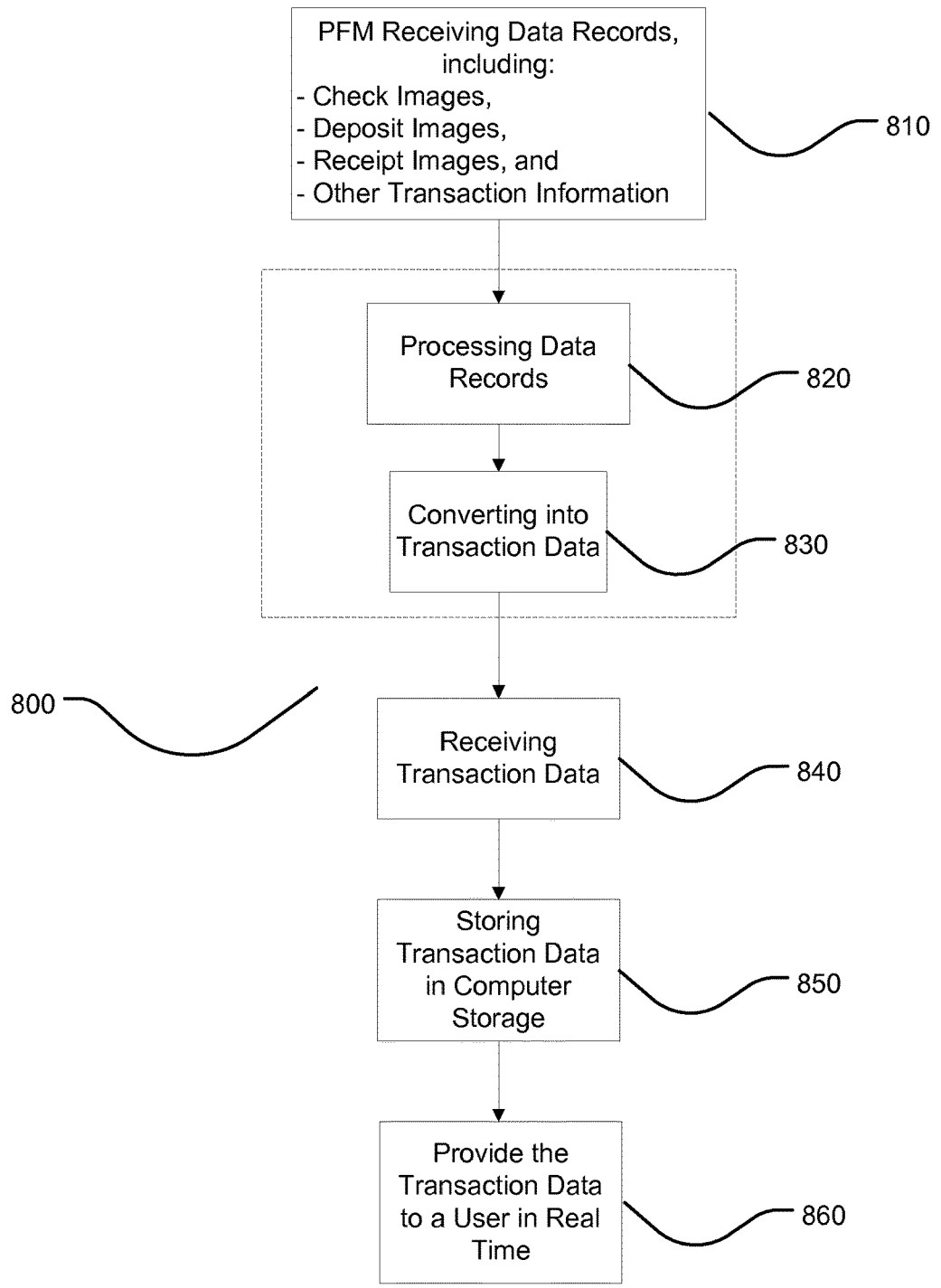
FIG. 8 illustrates a flow chart of an example method of a personal financial management tool receiving financial transaction data records from a user and simultaneously sending that financial transaction data to a third party personal financial management provider for processing, after which the financial transaction data may be pushed back to the user according to one implementation consistent with the teachings and principles of the disclosure.

FIG. 8 illustrates an implementation of an example method 800 of the disclosure, wherein a personal financial management provider may receive data records at 810, such as image data records that may comprise check images, deposit images, receipt images, and other transaction records, from a financial institution. The personal financial management provider may itself convey the images to a third party PFM (personal financial management provider) who may process, translate or otherwise convert the data records into transaction data at 820 and 830. At 840, the converted or translated data is received. At 850, the transaction data is stored in computer readable memory or storage. At 860, the processed data may be pushed in real time to back to the financial institution according to one implementation consistent with the teachings and principles of the disclosure.

Figure 9:
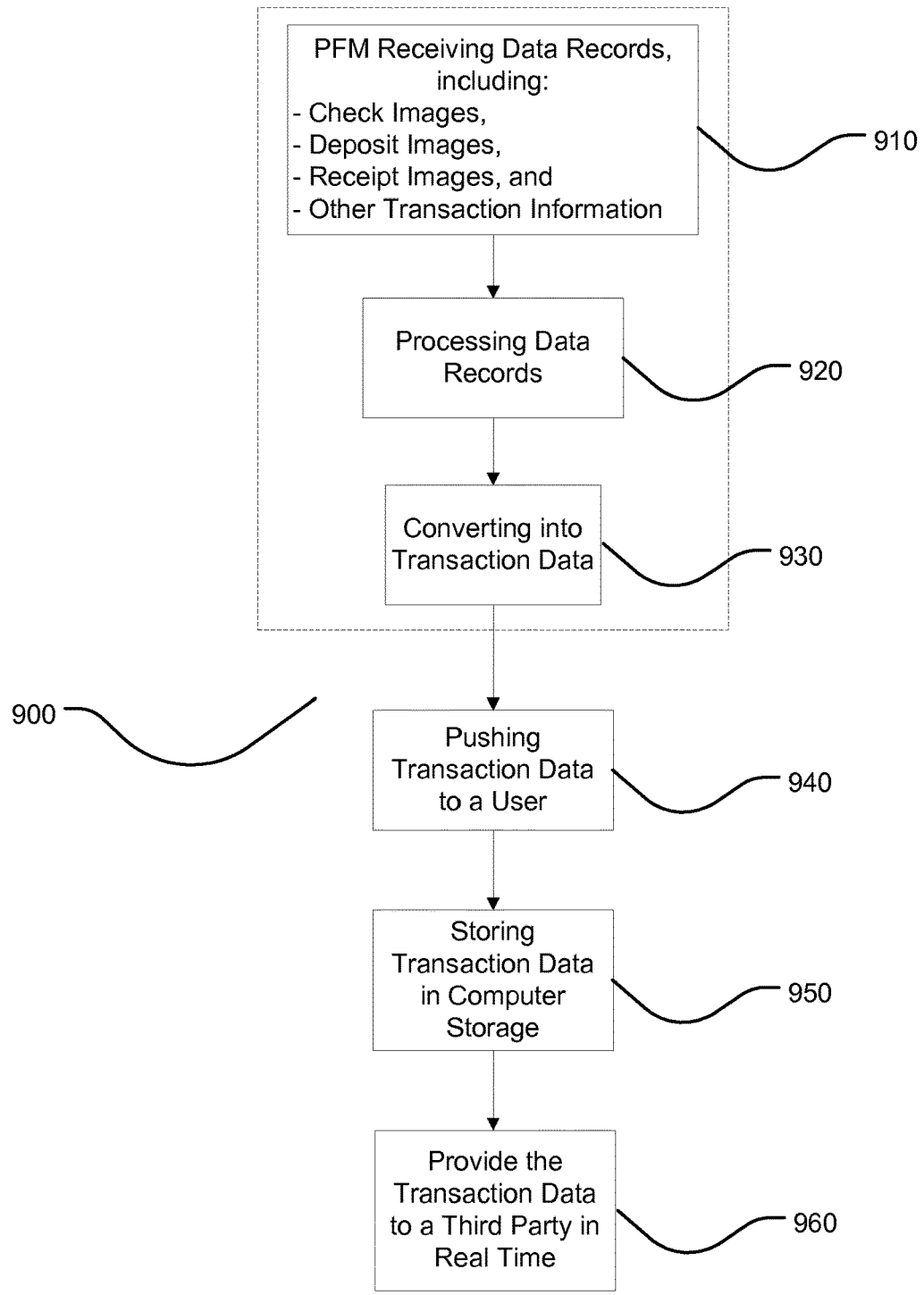
FIG. 9 illustrates a flow chart of an example method of a personal financial management tool receiving financial transaction data records from a financial institution and simultaneously processing those data records and translating the data records into transaction data, which may be pushed back to the financial institution according to one implementation consistent with the teachings and principles of the disclosure.

FIG. 9 illustrates an implementation of an example method 900 of the disclosure, wherein a personal financial management provider may receive data records at 910, such as image data records that may comprise check images, deposit images, receipt images, and other transaction records, from a user, which may be a financial or banking institution, a third party personal financial management provider, or an end user of a financial or banking product, such as a software product. The personal financial management provider may itself process, translate or otherwise convert the data records into transaction data at 920 and 930. At 940, the converted or translated data is pushed back to the user in real time. At 950, the transaction data is stored in computer readable memory or storage of the user. At 960, the processed data may be provided in real time to a third party user according to one implementation consistent with the teachings and principles of the disclosure.

Figure 10:
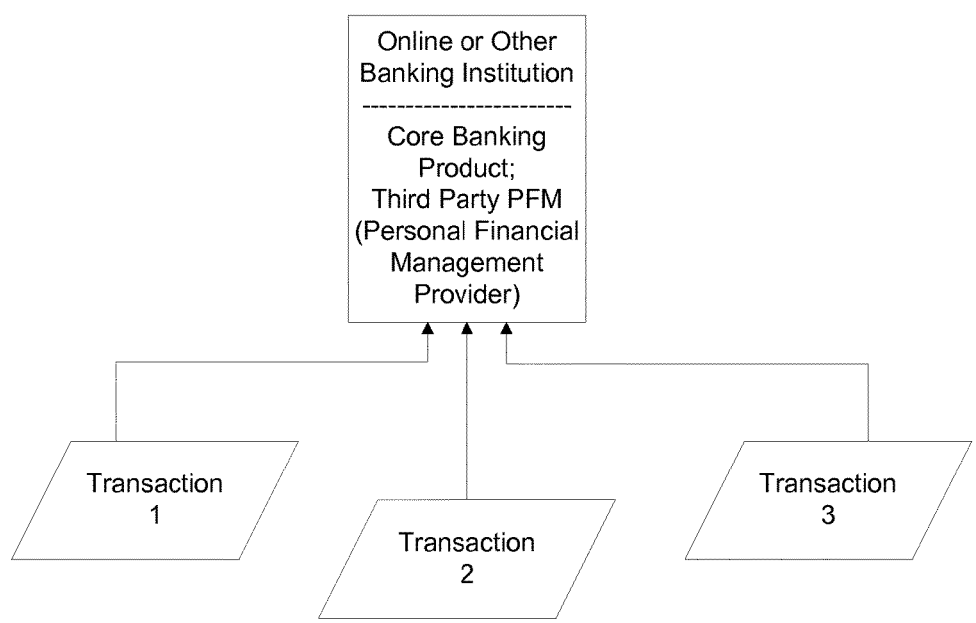
FIG. 10 illustrates a flow chart of an example method of a financial institution receiving financial transaction data into its core banking system or other financial product according to one implementation consistent with the teachings and principles of the disclosure.
Figure 11:
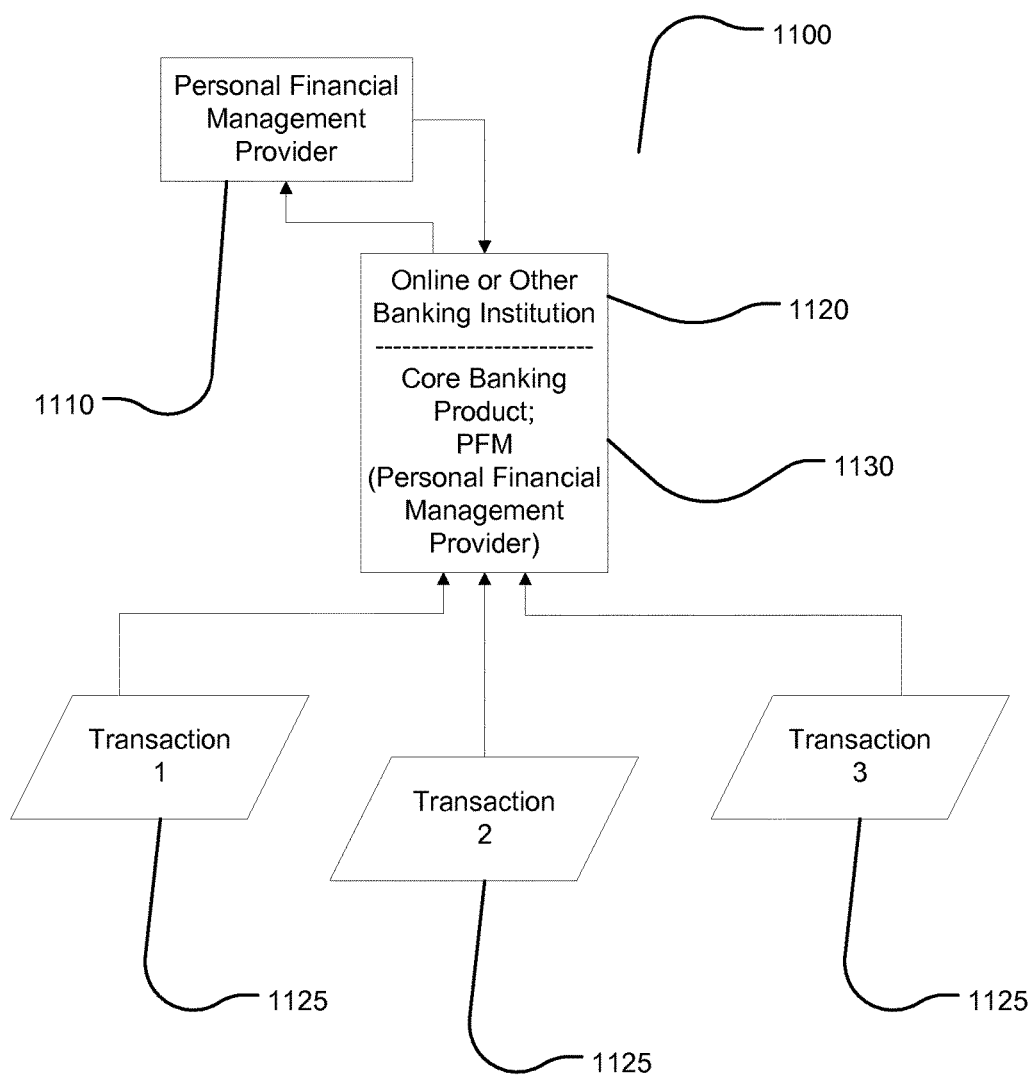
FIG. 11 illustrates a flow chart of an example method according to one implementation consistent with the teachings and principles of the disclosure.

Referring now to FIGS. 10-17, wherein various implementations for receiving core data, which may include transaction data, from a financial or banking institution and processing the data by cleansing the data, automatically categorizing the data, classifying the data, and then sending that processed data back to the financial or banking institution are illustrated. As illustrated in FIG. 10, it will be appreciated that existing personal financial management tools and software providers provide their tools or software product as a separate module of a financial or banking institution's core data system, whether presented online or otherwise.

Conversely, as illustrated in FIGS. 11-16, the disclosure contemplates constantly and immediately receiving into a personal financial management provider's tool 1110 a financial or banking institution's core data, which may include financial data and financial transaction data 1125, from the financial or banking institution's 1120 core data system 1130. The core data system 1130 may itself reside within the financial or banking institution 1120 or it may be part of a personal financial management software provided by itself or a third party. That core data may then be brought into the personal financial management tool or software product 1110 of the disclosure where the received core data may be processed. Once the core data is processed, as discussed more fully herein below, it is immediately sent back to the financial or banking institution's core data system for use by the financial or banking institution's personal financial management tool or software product. The process of receiving the financial or banking institution's core data, scrubbing the financial or banking institution's core data, and sending the scrubbed core data back to the financial or banking institution for its own use is contemplated by the disclosure.

Figure 12:
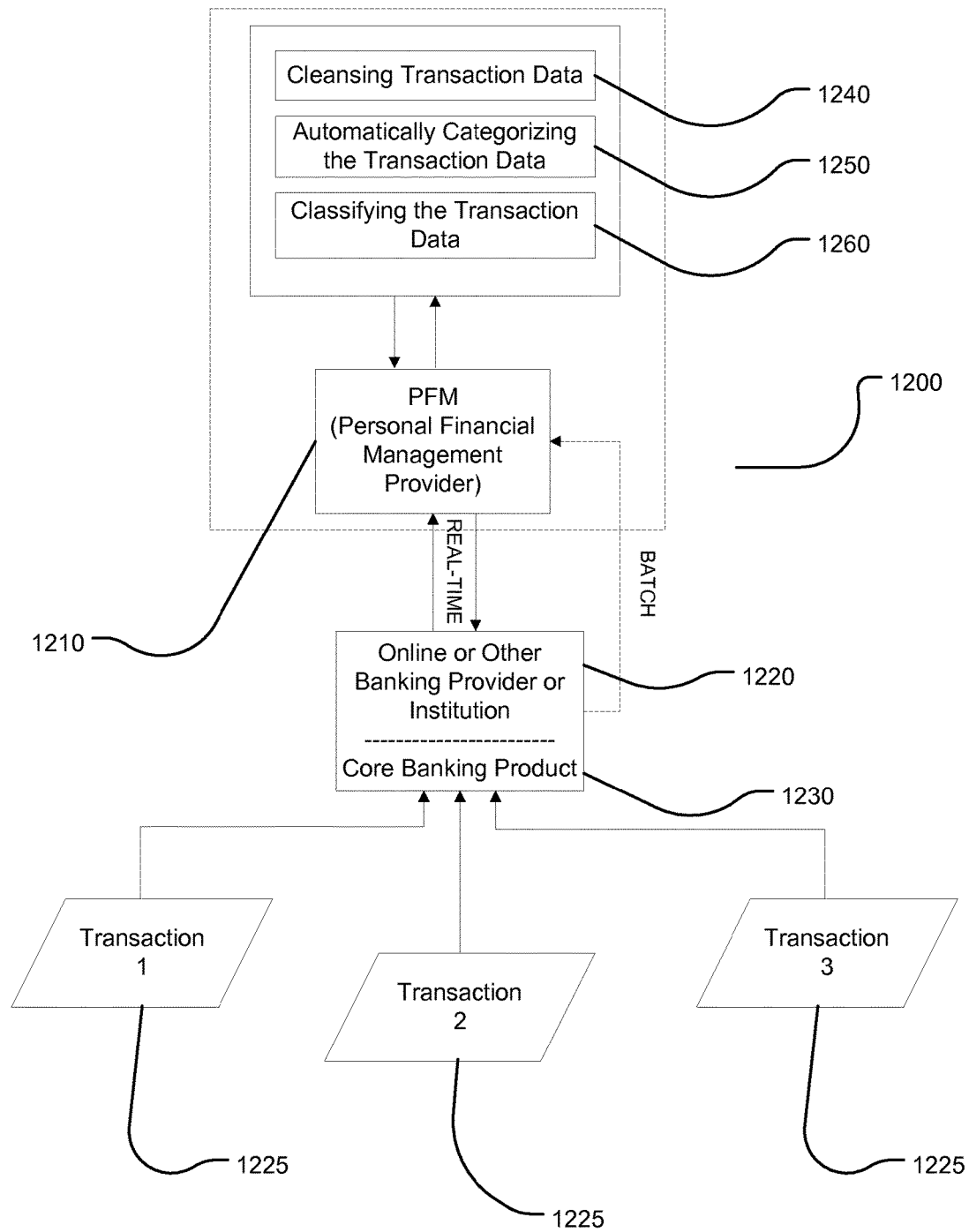
FIG. 12 illustrates a flow chart of an example method of a financial institution receiving financial transaction data into its core banking or other financial product and immediately sending that data for processing by a personal financial management tool or provider, after which the financial transaction data may be pushed to a user according to one implementation consistent with the teachings and principles of the disclosure.
Figure 13:
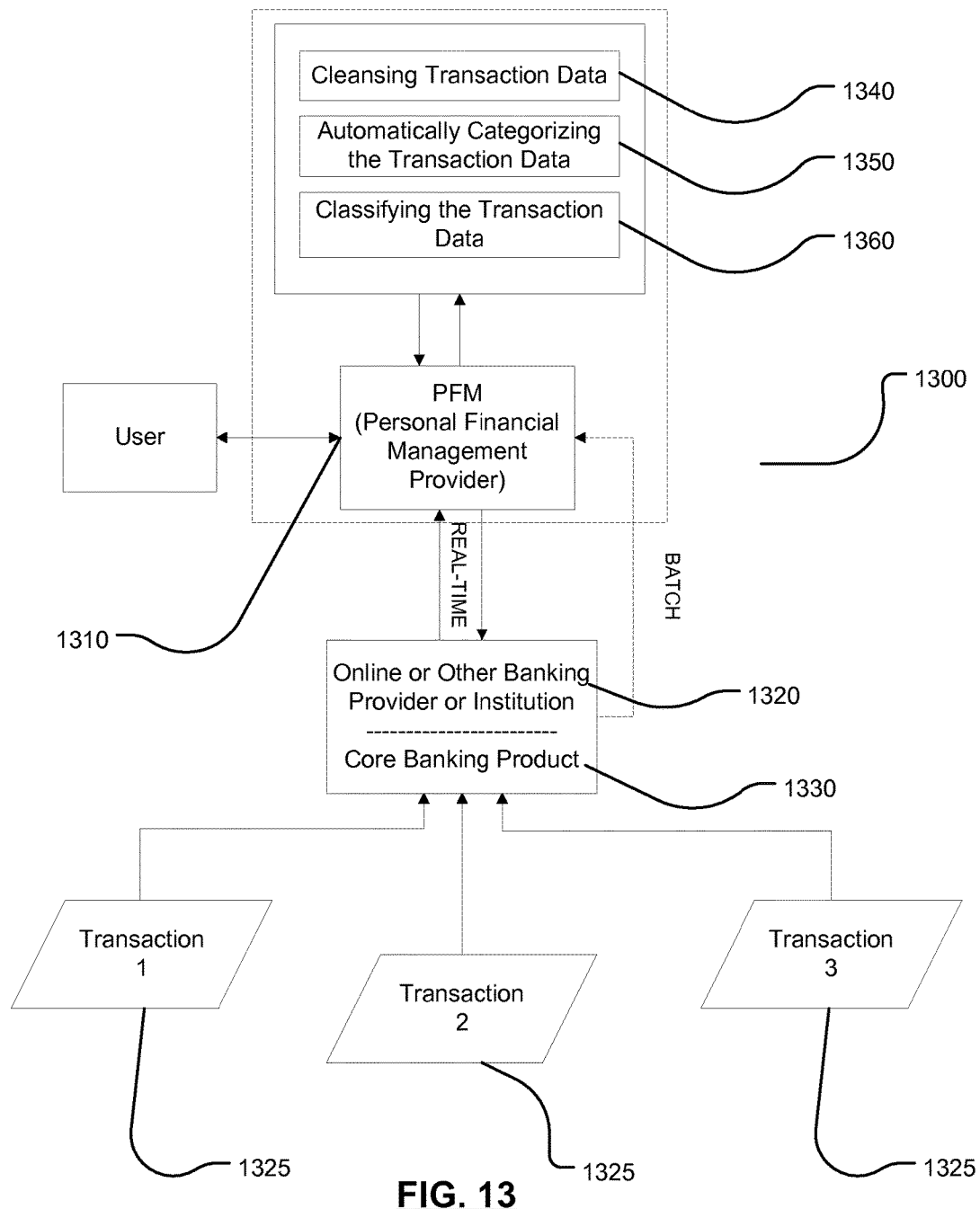
FIG. 13 illustrates a flow chart of an example method of a financial institution receiving financial transaction data into its core banking or other financial product and immediately sending that data for processing by a personal financial management tool or provider, after which the financial transaction data may be pushed to a user according to one implementation consistent with the teachings and principles of the disclosure.

Referring to FIGS. 12-13, in an implementation of the disclosure, the processing of the core data may include one or more of the following: (1) cleansing the core data at 1240; and/or (2) automatically categorizing the core data at 1250; and/or (3) classifying the core data at 1260. The above noted processes may be performed by a personal financial management provider that is a third party provider with respect to the financial or banking institution, or the processes may be performed by a financial management provider that may be provided as part of the services of the financial or banking institution without departing from the scope of the disclosure.

It will be appreciated that in an implementation of the disclosure the provider of the core data may request that the core data be processed by only one of the processes identified above and then sent back to it as illustrated in FIGS. 12-13. In an implementation, the provider of the core data may request that the core data be processed by all of the processes or some combination of the processes identified above and then sent back to it as illustrated in FIGS. 12-13.

In an implementation illustrated in FIG. 13, the personal financial management provider who processes the core data may send the processed data to one or both of a user or the provider of the core data.

It will be appreciated that data cleansing is a process wherein alphanumeric and other symbols or characters, identified by a user as extraneous information, are removed from a clustered description of a specific merchant in a posted transaction. The data cleansing process may also use those same alphanumeric and other symbols or characters to identify a specific merchant with near certainty based on prior use or posted transaction history. For example, the identity of a posted transaction may be represented as "56902 ABCXYZ PAYMENT 56902 8756250331." The data cleansing process may identify the transaction as recurring and remove the extraneous information to help better identify the merchant from the posted transaction description with near certainty, such that the merchant is readily recognized by a user. In the example above, the description and data therein would be cleansed to "ABCXYZ Company," which a user may readily recognize, for example, as its mortgage lender. The data cleansing process may adapt and may be customized to a specific user based on the user's history, such that as recurring or repeating descriptions are posted the data cleansing process immediately recognizes the description of the merchant and identifies it accordingly.

It will also be appreciated that the process of automatically categorizing includes identifying posted transactions and including them into one of a plurality of categories and/or sub-categories. For example, categories may include household, mortgage, auto, groceries, business supplies, utilities, medical, miscellaneous, dining or restaurants, insurance, gifts, education, clothing, home repair, or other categories. It will be appreciated that any number of categories may be used and any number of sub-categories may be placed beneath each category without departing from the scope of the disclosure. The categorization process may be personalized using the history of a user. For example, a user may frequent a gas station near that user's house for two purposes: (1) to fill up an automobile with gasoline on a weekly basis; and (2) to buy coffee and breakfast every work day. The categorization process may categorize spending over a certain amount at that gas station as a gasoline expense, while the process may categorize spending under a certain amount at that gas station as a fast food expense. In either case, the automatic categorization process may be personalized and customized based on a user's prior spending history.

It will further be appreciated that the process of classifying is identifying the true meaning or nature of the transaction. For example, a recurring payment made to the same merchant month after month in generally the same amount each payment may be classified as an existing bill pay or in another option it may be identified as a potential bill pay.

Figure 14:
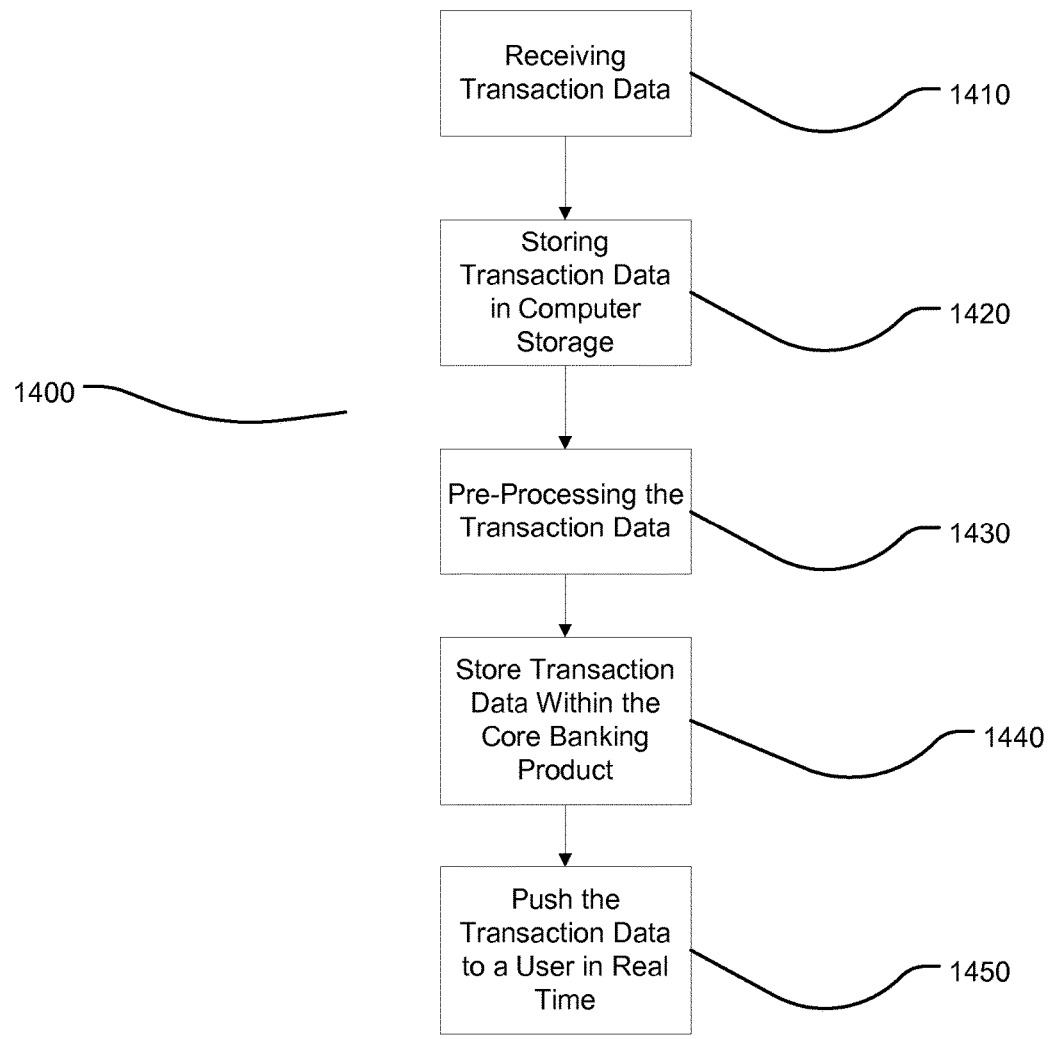
FIG. 14 illustrates a flow chart of an example method according to one implementation consistent with the teachings and principles of the disclosure.
Figure 15:
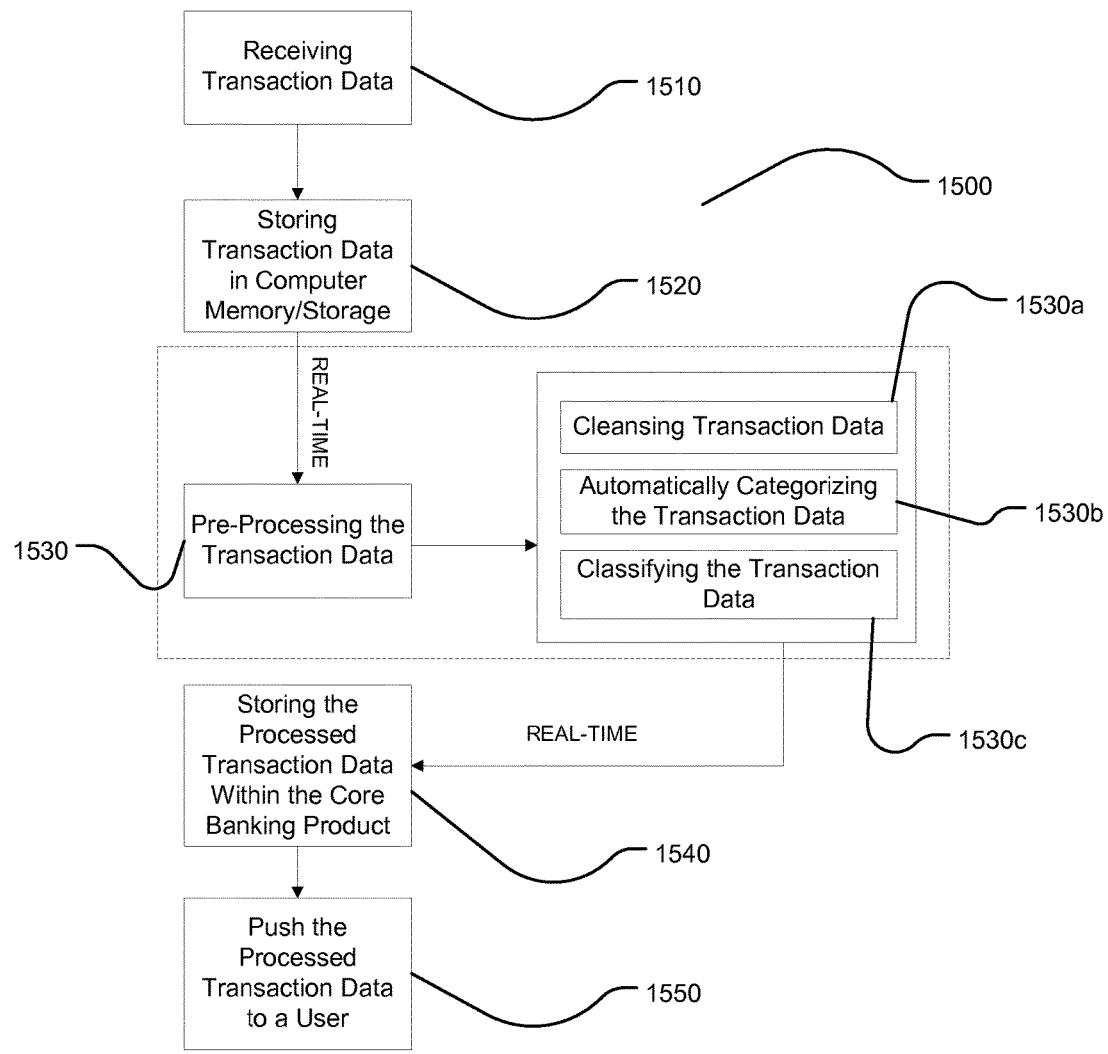
FIG. 15 illustrates a flow chart of an example method of providing cleansed transaction data, and/or automatically categorized transaction data, and/or classified transaction data to a user according to one implementation consistent with the teachings and principles of the disclosure.
Figure 16:
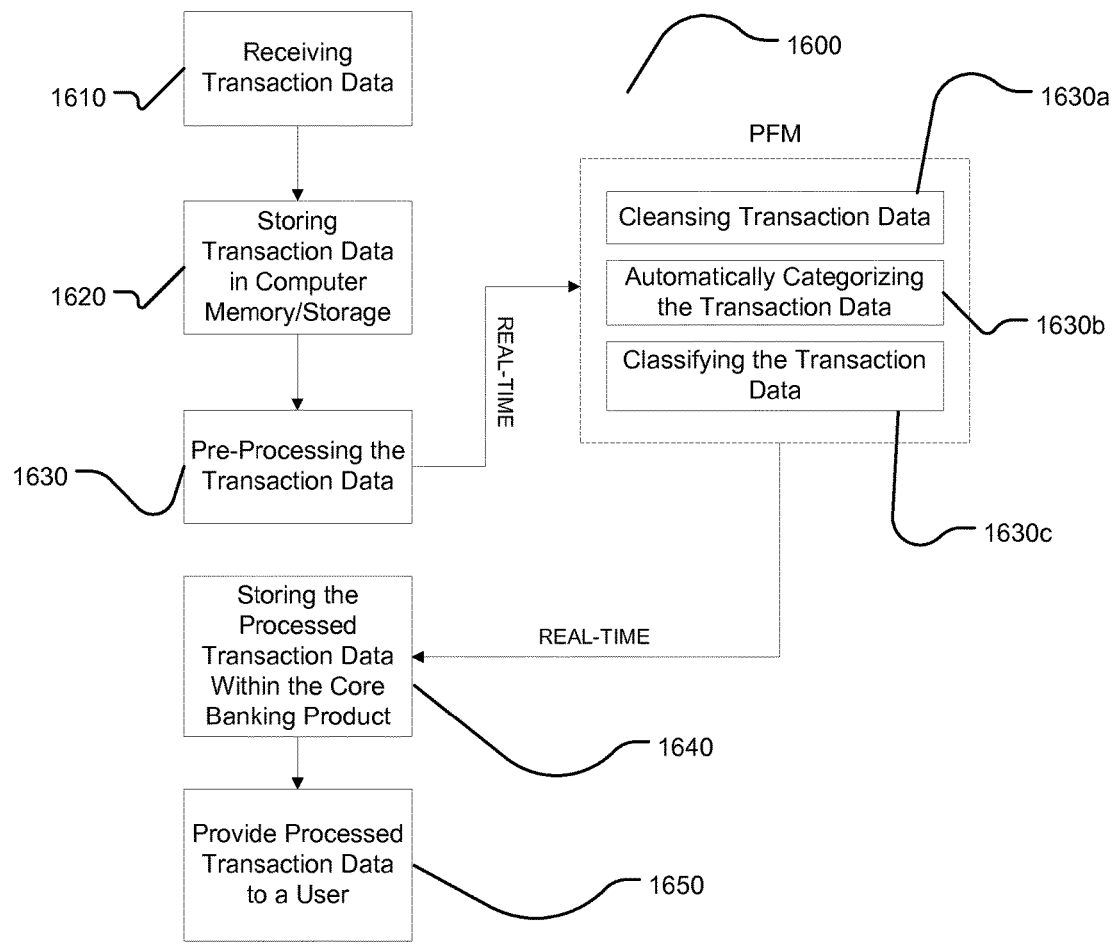
FIG. 16 illustrates a flow chart of an example method of providing cleansed transaction data, and/or automatically categorized transaction data, and/or classified transaction data to a user according to one implementation consistent with the teachings and principles of the disclosure.

Referring specifically now to FIGS. 14-16, implementations of a method of providing processed core data to a financial or banking institution may comprise receiving core data representing a real world financial transaction from a core banking product over a computer network at 1410, 1510, 1610. The core data may be stored in a computer readable storage for processing at 1420, 1520, 1620. The core data may be pre-processed at 1530, 1630 with one or more of the following processes: (1) cleansing the core data at 1530*a*, 1630*a*, and/or (2) automatically categorizing the core data at 1530*b*, 1630*b*, and/or (3) classifying the core data at 1530*c*, 1630*c*. The one or more of cleansed core data, categorized core data, or classified core data may then be sent back to the core banking product at 1440, 1540, 1640. The core banking product may then provide the processed transaction data to a user at 1450, 1550, 1650.

In an implementation of the disclosure, the core data representing a real world financial transaction may be received in real-time or pushed from the core banking product over a computer network as illustrated. The financial or banking institution may send that data immediately so as to provide the data to a user in a cleansed, categorized, and/or classified form before displaying it to a user. In such an implementation, when a financial transaction occurs and before the financial or banking institution provides that information to a user, the financial or banking institution may provide the transaction data, which may be part of its core data, to the personal financial management tool or software product of the disclosure for processing. Once processed, cleansed, categorized, and/or classified as discussed herein above, the transaction data, which may be part of the core data of the institution, is immediately sent back to the financial or banking institution to be posted for a user in real-time. It will be appreciated that the data sent back to the financial or banking institution has been transformed from raw transaction data into processed, cleansed, categorized, and/or classified data that is ready to be displayed as such to a user. The concept of real-time pushing of data back and forth as disclosed herein is accomplished due to the processing power and speed of computing technology. Because of that power and speed, the transaction data may be provided from the financial or banking institution to the personal financial management tool and software product of the disclosure, where it is processed, cleansed, categorized, and/or classified, and sent back in milliseconds, for example 20-40 milliseconds. Accordingly, the processing and posting of the transaction data may be provided in milliseconds or what is considered real-time. It will be appreciated that the transaction data may be sent back and forth as a single data record or as a plurality of data records without departing from the scope of the disclosure.

In an implementation of the disclosure, as illustrated in FIGS. 12-13, the core data representing a real world financial transaction may be received in a batch from the core banking product over a computer network.

In an implementation, as illustrated in FIGS. 12-13, the core data representing a real world financial transaction may be received by pulling the core data from the core banking product over a computer network.

It will be appreciated that in an implementation, as illustrated in FIGS. 12-13, the core data may be cleansed transaction data, and/or automatically categorized transaction data, and/or classified transaction data that may be presented or pushed, whether in real-time or otherwise, to a user such as a banking institution, a personal financial management provider, or an end user of a core banking or financial product.

Referring back to FIG. 13, an implementation of a method of providing processed core data to a financial or banking institution may comprise receiving core data representing a real world financial transaction from a core banking product over a computer network. In the implementation, the method is similar to that shown and described with respect to FIG. 12 with the addition that the personal financial management tool or software provider may also provide the processed data not only to the financial or banking institution directly, but also directly to the user. In an implementation the user may be an end user, or a third party personal financial management provider.

Figure 17:
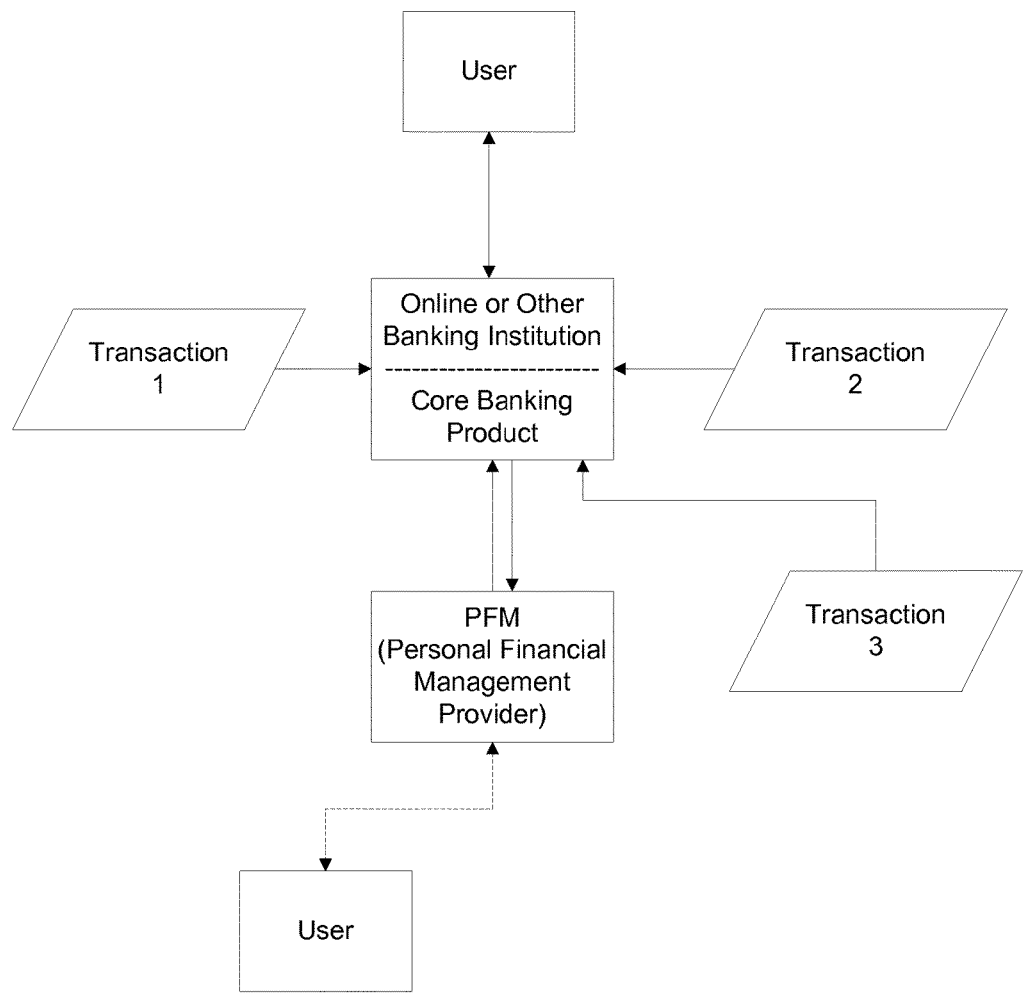
FIG. 17 illustrates a flow chart of an example method according to one implementation consistent with the teachings and principles of the disclosure.

Referring now to FIG. 17, an implementation of a method of providing processed core data may comprise receiving core data representing a real world financial transaction from a core banking product over a computer network. In the implementation, the method is similar to that shown and described with respect to FIGS. 12-13 with the exception that the personal financial management tool or software provider may push the processed data directly to the user or receive information or data directly from the user. In other words, there is no intermediary between the personal financial management provider who processes the data and the user.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims or exemplary embodiments appended hereto, any future claims submitted here and in different applications, and their equivalents.

In the foregoing Detailed Description, various features of the disclosure are grouped together in a single implementation for the purpose of streamlining the disclosure. This method of disclosure is not to be interpreted as reflecting an intention that the disclosure requires more features than are expressly recited in each claim or exemplary embodiment. Rather, as the following claims reflect, inventive aspects lie in less than all features of a single foregoing disclosed implementation. Thus, the following exemplary embodiments are hereby incorporated into this Detailed Description by this reference, with each embodiment standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method comprising:
   pulling, in real-time by an online server from at least one financial institution device over a computer network, financial transaction data representing a current financial transaction involving a user and a merchant, the financial transaction data comprising financial record images, the financial record images comprising one or more of check images, deposit images, and receipt images;
   translating, in real-time by the online server, the financial record images into computer readable characters representing financial transaction data to identify one or more financial transaction attributes of each of the financial record images, the financial transaction attributes comprising one or more of a date, a payee, and an amount of the financial transaction;

cleansing, in real-time by the online server, the financial transaction data by:

accessing a clustered description of the merchant in the financial transaction data, the clustered description including a string of alphanumeric characters, some of the alphanumeric characters in the string being a name of the merchant and others of the alphanumeric characters in the string being extraneous alphanumeric characters;

determining that at least a portion of the clustered description of the merchant in the financial transaction data occurred in a previous financial transaction;

identifying the extraneous alphanumeric characters in the string based at least in part on the user previously identifying the extraneous alphanumeric characters in the previous financial transaction; and cleansing the string by removing the extraneous alphanumeric characters from the string to make the string representing the financial transaction more readable to the user when the string is presented on a display interface;

classifying, in real-time by the online server, the financial transaction by a type of the financial transaction, the type of the financial transaction determined at least in part on one or more previous financial transactions that are substantially similar to the financial transaction; and providing, in real-time from the online server over the Internet and to a website of or an app of a financial institution accessed by the user, the cleansed and classified string to the user as the name of the merchant involved in the financial transaction.

2. The method of claim 1, wherein the extraneous alphanumeric characters are positioned before the name of the merchant in the string.

3. The method of claim 1, wherein the extraneous alphanumeric characters are positioned after the name of the merchant in the string.

4. The method of claim 1, wherein the extraneous alphanumeric characters are positioned both before and after the name of the merchant in the string.

5. The method of claim 1, wherein the online server is operated by the financial institution.

6. The method of claim 1, wherein the online server is operated by a personal financial management provider that is a third party to the financial institution.

7. The method of claim 1, wherein the financial transaction is a posted financial transaction.

8. The method of claim 1, wherein:

the string further includes other symbols or characters;

some of the other symbols or characters in the string are the name of the merchant and others of the other symbols or characters in the string are extraneous other symbols or characters;

the identifying of the extraneous alphanumeric characters in the string further includes identifying of the extraneous other symbols or characters in the string; and the cleansing of the string by removing the extraneous alphanumeric characters from the string further includes cleansing the string by removing the extraneous other symbols or characters from the string.

* * * * *